US008366277B2

(12) United States Patent
Melzner et al.

(10) Patent No.: US 8,366,277 B2
(45) Date of Patent: Feb. 5, 2013

(54) PROJECTORS HAVING FACETTED REFLECTORS WHICH ARE MOVABLE RELATIVE TO THEIR LAMPS

(75) Inventors: Erwin Melzner, Frasdorf (DE); Volker Schumacher, Bald Waldsee (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 449 days.

(21) Appl. No.: 11/922,836

(22) PCT Filed: Jun. 19, 2006

(86) PCT No.: PCT/EP2006/005951
§ 371 (c)(1), (2), (4) Date: Feb. 5, 2008

(87) PCT Pub. No.: WO2006/136388
PCT Pub. Date: Dec. 28, 2006

(65) Prior Publication Data

US 2008/0198605 A1 Aug. 21, 2008

(30) Foreign Application Priority Data

Jun. 22, 2005 (DE) ......................... 10 2005 029 669

(51) Int. Cl.
*G03B 21/28* (2006.01)
*F21V 7/00* (2006.01)

(52) U.S. Cl. .......................................... 353/98; 362/297

(58) Field of Classification Search .................... 353/98, 353/87; 362/277, 285, 294, 291, 292, 296.01, 362/297

See application file for complete search history.

(56) References Cited

U.S. PATENT DOCUMENTS 4,841,422 A * 6/1989 Groh ............................ 362/294
5,272,408 A * 12/1993 Levin et al. .................. 313/113
5,446,637 A 8/1995 Cunningham et al.

(Continued)

FOREIGN PATENT DOCUMENTS

DE 38 12 232 A1 10/1989
DE 198 37 501 A1 10/1999

(Continued)

OTHER PUBLICATIONS

English translation of International Preliminary Examination Report for corresponding PCT application No. PCT/EP2006/005951, dated Jan. 16, 2008.

(Continued)

*Primary Examiner* — Thanh Luu
(74) *Attorney, Agent, or Firm* — Christie, Parker & Hale, LLP

(57) ABSTRACT

A projector having a lamp and a reflector that reflects the light beams emitted by the lamp toward a light exit opening of the projector is provided. It is possible to vary the position of the reflector and of the lamp relative to one another, and to set the distribution of the exiting light by displacing the reflector and/or the lamp. The reflector is provided with facets that form a reflective surface for reflecting the light beams emitted by the lamp. The facets being constituted by their surface shaping such that the light beams generate a light field with a desired light distribution and whose light beam width can be set in a wide range by displacing the reflector and/or the lamp.

35 Claims, 8 Drawing Sheets

U.S. PATENT DOCUMENTS

| | | | | |
|---|---|---|---|---|
| 6,070,993 | A * | 6/2000 | Natsume | 362/309 |
| 6,273,595 | B1 | 8/2001 | Wittmeier et al. | |
| 6,361,175 | B1 | 3/2002 | Kittelmann et al. | |
| 6,390,649 | B1 * | 5/2002 | Tang | 362/285 |
| 6,598,993 | B1 * | 7/2003 | Dalton et al. | 362/202 |
| 6,837,596 | B2 * | 1/2005 | Tanaka et al. | 362/277 |
| 6,899,451 | B2 | 5/2005 | Kittelmann et al. | |
| 6,979,107 | B1 * | 12/2005 | Benensohn | 362/374 |

FOREIGN PATENT DOCUMENTS

| | | | |
|---|---|---|---|
| DE | 198 43 986 | A1 | 3/2000 |
| DE | 199 10 192 | C2 | 9/2000 |
| DE | 100 17 658 | A1 | 10/2001 |
| DE | 101 13 385 | C1 | 4/2003 |
| DE | 299 24 453 | U1 | 3/2004 |
| EP | 0 005 080 | A1 | 10/1979 |
| EP | 1 035 370 | A2 | 9/2000 |
| JP | 06-338209 | | 12/1994 |
| JP | 08-045316 | | 2/1996 |
| JP | 11-258566 | | 9/1999 |
| WO | WO 92/17733 | | 10/1992 |

OTHER PUBLICATIONS

International Search Report, dated Jan. 4, 2007, corresponding to PCT/EP2006/005951.

Japanese Office action for Application No. 2008-517406, dated Jan. 18, 2011, 2 Pages.

English Translation of Japanese Office action for Application No. 2008-517406, dated Jan. 18, 2011, 1 Page.

* cited by examiner

PROJECTORS HAVING FACETTED REFLECTORS WHICH ARE MOVABLE RELATIVE TO THEIR LAMPS

CROSS-REFERENCE TO A RELATED APPLICATION

This application is a National Phase Patent Application of International Patent Application Number PCT/EP2006/005951, filed on Jun. 19, 2006, which claims priority of German Patent Application Number 10 2005 029 669.6, filed on Jun. 22, 2005.

BACKGROUND

The invention relates to a projector.

In order to expand or constrict the light field of a projector having a projector housing in which a lamp and a paraboloidal reflector are arranged, and whose light exit opening is covered by one or more protective plates, the lamp is displaced in an axial direction relative to the reflector such that in order to set the shape of the light field the lamp is moved either into the reflector or in the direction of the focal point of the reflector, in order to obtain a bundling of the light field, or is moved out of the reflector away from the focal point of the reflector, in order to achieve an expansion of the light field. A maximum bundling of the light is obtained when the lamp is located exactly at the focal point of the paraboloidal reflector such that the exiting light beams exit the projector in a fashion substantially parallel to one another. In the case of a wide light field, the lamp is stationed in a forward position in the reflector, and the exiting light beams behave convergently, that is to say at first they are condensed and cross one another in a region in front of the light exit opening of the projector and then diverge. The distribution of the exiting light beams is frequently characterized in this case via the half scattering angle.

A large half scattering angle signifies a wide light field, while a small half scattering angle describes a strongly bundled light field.

A projector of the above named type generally has a high light yield. In the case of a wide light field however, the exiting light beams form a region of high light density by their convergent beam course, and so thermal UV loading in the surroundings of the projector can be large. Moreover, influencing the exiting light beams requires additional diffusion plates in front of the protective plate in order to effect a light field with an optimum light distribution for a range of half scattering angles. However, such an arrangement cannot be used to optimize the light field for a large range of half scattering angles.

Moreover, use is made of projectors having a spherical reflector, a stationary lamp at the center of curvature of the reflector, and a stepped lens arranged in front thereof. In order to set the desired light field, the arrangement consisting of reflector and lamp is moved relative to the stepped lens, and an expansion or bundling of the light field is attained in this way. Such a projector can be used to set the optimum light field over a large range of half scattering angles, and to adjust it continuously, although the projector generally has a poor efficiency and, in particular, requires heavy step lenses to shape the exiting light beams for projectors having large powers.

SUMMARY

It is the object of the invention to make available a projector that renders possible a desired light field for a large range of half scattering angles and has a high efficiency.

An exemplary solution according to an exemplary embodiment of the invention makes available a projector in the case of which a reflector is provided with facets that form a reflective surface for reflecting the light beams emitted by a lamp, the facets being formed by their surface shaping such that the light beams generate a light field with a desired light distribution and whose light beam width can be set in a wide range by displacing the reflector and/or the lamp.

The exemplary solution therefore yields a projector that combines the advantages of a projector having a paraboloidal reflector and a projector having a spherical reflector, has a high light yield, creates by means of the reflector provided with facets a desired light distribution for a wide range of settable light beam widths, and manages in the process without additional diffusion plates, lens plates, stepped plates or the like for shaping the light beams.

In the case of the inventive projector, the light beam width can be set over a wide range, while maintaining the desired light distribution, by varying the relative position of lamp and reflector. The projector is preferably designed in this case such that the half scattering angle describing the light beam width of the exiting light varies between approximately 10° and 50°. The half scattering angle in this case denotes the aperture angle of the exiting light beams, and is defined as the angular range in which the intensity of the light is equal to or greater than 50% of the maximum light intensity.

Such a projector is therefore capable of delivering bundled light fields with small half scattering angles, or wide light fields with large half scattering angles, the desired light distribution being generated as a function of the half scattering angle. This renders it possible for the projector, which can serve both as an illuminating surface light and as a bundled spotlight and be set continuously during operation, to be used in various ways.

In an exemplary refinement, the projector is conceived in this case such that the light beams exit the projector in a divergent way in order thus to avoid a region of high optical and thermal density—a so-called "hot spot"—in the region of the light exit opening of the projector, and to reduce the risk of overheating of objects in the region of the projector. In the bundled case, the light beams then exit virtually in parallel and form a light field with a small light beam width, while in the case of a wide light field the beams run in a divergent way out of the reflector and do not cross one another until in the far field, without forming a region of high thermal density in the vicinity of the projector.

It is also possible to design an exemplary projector according to an exemplary embodiment of the invention such that the beam path of the exiting light beams ensues in a convergent way. In this case, the light beams for generating a wide light field would firstly be condensed in a region in front of the projector and cross one another, after which they would subsequently diverge. Irrespective of whether the beam path ensues in a divergent or convergent way, the design of the reflector provided with facets ensures that the light beams are reflected such that the desired light field is formed, that is to say a suitable thorough mixing of the light beams is achieved and the desired light intensity distribution is attained. In particular, it is possible in this way to generate a light field with a uniform light distribution without there being a need to make use for this purpose of separate components in the form of lenses and plates.

The lamp and the reflector are exemplary arranged in a projector housing that has a light exit opening that is covered by a translucent cover element, for example in the form of a glass plate serving as protective plate. The projector is designed in this case such that the spacing between lamp and reflector along the reflector axis is reduced in order to expand the light beam width of the exiting light, and is enlarged in order to decrease the light beam width. In the case of maximum light bundling, the lamp is thus stationary in a position in which it has a maximum spacing from the reflector. By reducing the spacing between the reflector and lamp, the beam is then widened and the light beams drift apart in a divergent way. In the case when the beam path of the reflector is of a convergent nature, the change in the spacing can also take place in exactly the reverse fashion. In this case, the spacing between lamp and reflector is decreased to bundle the light and, conversely, is enlarged to expand the light.

The lamp is exemplary arranged in a stationary fashion in the projector, and the reflector is displaced relative to the lamp in order to set the light beam width along its reflector axis. In the case of the divergent beam path, it is, on the one hand, necessary to arrange the reflector in the direct vicinity of the light exit opening of the projector given an expanded light distribution, so that the exiting light beams are not shaded by the housing. On the other hand, however, in the state of maximum light bundling, in which the lamp is positioned far forward in the reflector or even projects forward out of the reflector, it is necessary to observe a minimum spacing from the protective plate.

These two exemplary requirements can be combined when the lamp is arranged in a stationary fashion in the projector, and the reflector is displaced along its reflector axis in order to set the light beam width, that is to say is moved toward the light exit opening, covered by the protective plate, of the projector for light expansion, and is moved away from the light exit opening for light bundling. In this case, the spacing between lamp and protective plate is constant irrespective of the light beam width set, thus avoiding excessive heating of the protective plate by the lamp irrespective of the light beam width set. The arrangement has the additional advantage that owing to the stationary lamp, it is also possible to fasten the high voltage cables necessary for feeding the lamp and all other components such as, for example, a lamp holder, a lamp base and a cooling system coupled to the lamp, to be fastened rigidly in the projector.

The reflector of the projector can have an approximately paraboloidal or ellipsoidal basic shape that is substantially designed with rotational symmetry about a reflector axis. Deviations from the rotational symmetry can result, however, from the surface shaping of the facets arranged on the reflector. Paraboloidal or ellipsoidal design of the reflector ensures that the projector has a high light yield and thus a large efficiency.

The reflector can have a first opening for holding a lamp and a second opening as light exit opening. The lamp arranged on the projector extends through the first opening into the reflector such that the light generated by the lamp is reflected by the reflector toward the second opening and leaves the projector via the light exit opening provided on the projector.

The first opening for holding the lamp can in principle be arranged arbitrarily in the reflector. However, it is preferred to position the two openings such that they are spaced apart in the direction of the reflector axis and are aligned approximately parallel to one another and perpendicular to the reflector axis. The first opening for holding the lamp is arranged in this case in the region of the vertex of the paraboloidal or the ellipsoidal reflector body such that the lamp extends through the opening along the reflector axis into the reflector, and the position of the lamp relative to the reflector can be varied along the reflector axis by displacing either the reflector or the lamp along the reflector axis. The second opening, serving as light exit opening is arranged in a fashion spaced apart axially from the first opening of the reflector in the expanded region of the paraboloidal or the ellipsoidal body of the reflector, and is aligned parallel to the first opening so as to produce a paraboloidal or ellipsoidal reflector body open in the direction of the reflector axis.

The reflective surface of the reflector is formed according to the invention from a multiplicity of facets. In the case of a paraboloidal or ellipsoidal, rotationally symmetrical basic shape, the reflector is in this case preferably divided along its circumference about the reflector axis into a multiplicity of sectors in which the facets are arranged. The sectors extend from the first opening of the reflector toward the second opening, serving as light exit opening, of the reflector and form columns of facets.

Since the light generating lamp is generally of rotationally symmetrical design, that is to say the light generated is incident on the reflector in a rotationally symmetrical way from the lamp arranged on the reflector axis, the sectors comprising the columns of facets are advantageously arranged so as to generate a likewise approximately rotationally symmetrical light field such that they form a periodic structure along the circumference perpendicular to the reflector axis.

It is true that the reflector is then designed to be rotationally symmetrical about the reflector axis in the case of a macroscopic consideration of the reflector body. However, a deviation from the rotational symmetry arises from the surface structure of the facets which creates a periodically formed surface structure of the reflector particularly along the circumference about the reflector axis.

Owing to the periodic arrangement of the sectors, the facets form rows of identical facets which are concentric with the reflector axis, the facets being able to differ from row to row in shaping and alignment.

In order to achieve the desired light intensity distribution, the facets forming the reflector can be of flat, curved or structured design. Owing to the surface shaping of the facets, the scattering of the light beams is determined and there is, moreover, the effect of producing the desired scattering for a wide range of settable half scattering angles. In particular, the facets can have a concave contour in one spatial direction and a convex contour in another spatial direction. The facets are in this case preferably designed such that they have a concave contour in the longitudinal section along the reflector axis and a transverse axis, and have a convex contour in the cross section perpendicular to the reflector axis. In this way, it is possible to achieve an advantageous light distribution of the exiting light in the case of which the light beams are mixed such that the desired light distribution is set in the far field of the projector.

As a result of the design of the faceted reflector, the exiting light beams generate a light field with the desired, optimum light distribution. In order, moreover, to form the light distribution and to vary it during operation, it is conceivable to arrange additional plates, in particular lens plates, diffusion plates and/or stepped plates in the region of the light exit opening of the projector.

The inventive projector is exemplary used as a high power lamp in the kW range, in the case of which heat can be intensively developed because of the large powers converted. It is therefore indispensable for such lamps that the components of the projector, in particular the reflector, are designed to be heat resistant.

To this end, the facets forming the reflector can be constructed entirely or partially from a heat resistant material such as glass or glass ceramic and be of single layer or multilayer structure. In particular, it is expedient for the facets to be produced from such a material in the immediate vicinity of the lamp, that is to say in the region of the first opening of the reflector through which the lamp extends into the reflector. This prevents the reflector from being damaged by overheating in the regions in which it is most strongly heated during operation, that is to say in the regions arranged in the vicinity of the lamp.

In one exemplary refinement, the projector further has a convective cooling device partially enclosing the lamp for producing a convection flow that dissipates the heat output by the lamp. In order to enable cooling of the reflector even on the side facing the lamp, the reflector can in this case have in the upper and lower region of the reflector openings that are made by completely or partially removing individual facets and through which a cooling air flow produced by the convective cooling device can flow through the reflector.

In one exemplary embodiment of the projector, it is possible to provide in the reflector a cutout that is formed by virtue of the fact that an annular region comprising one or more rows of facets, or a sector-shape region, comprising one or more columns of facets, of the reflector is left free. By way of example, a cooling air flow can flow into the reflector and through the reflector through a cutout thus created.

In order to reduce the light losses effected by the cutout, in one advantageous refinement the annular and/or column-shaped cutout can be covered by a radially spaced apart section that is formed from reflecting facets, covers the cutout completely when viewed from a possible lamp position on the reflector axis, and extends approximately parallel to the surface of the reflector. In particular, the section for covering the cutout can be formed by a ring and/or sector whose dimensions are enlarged by contrast with the region cut out in the reflector, the ring or the sector of facets in this case being constituted such that it is arranged in front of or behind the actual surface of the reflector when viewed from the reflector axis. This creates an interruption in the reflector for the penetration of the cooling air flow in the case of a simultaneously optically virtually unaltered reflector arrangement such that the light losses effected by the cutout are minimized.

By altering, with particular regard to surface shaping and arrangement, the design of the facets that form the radially spaced apart, for example annular or column-shaped section for covering the cutout, it is possible to effect that the light distribution of the reflector provided with the cutout is not changed by comparison with the reflector without cutout such that the reflector arrangement generates the desired light distribution.

BRIEF DESCRIPTION OF THE DRAWINGS

The idea on which the invention is based is to be explained in more detail with the aid of an exemplary embodiment in the following figures, in which.

DETAILED DESCRIPTION

Figure 1:
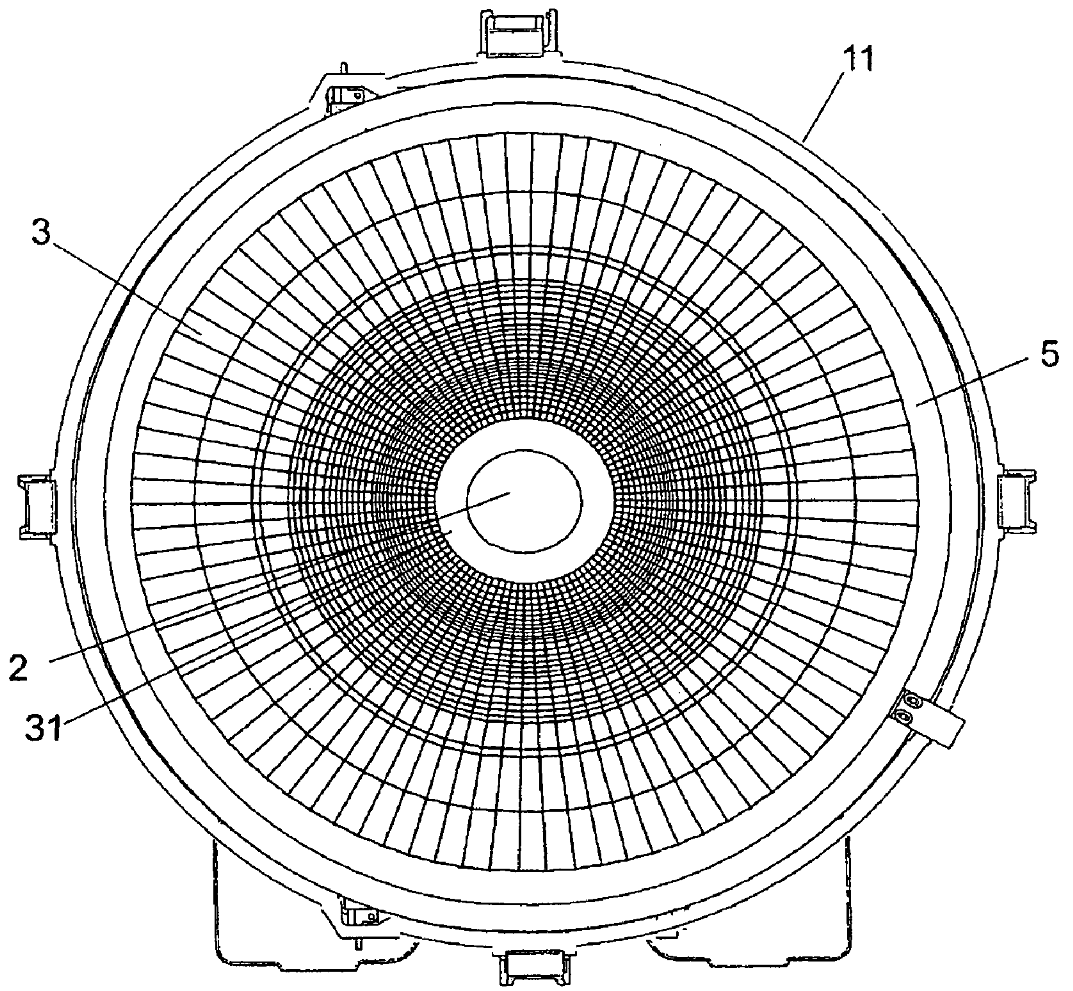
FIG. 1 shows a front view of a projector having a faceted reflector while looking into the projector from the front.
Figure 2:
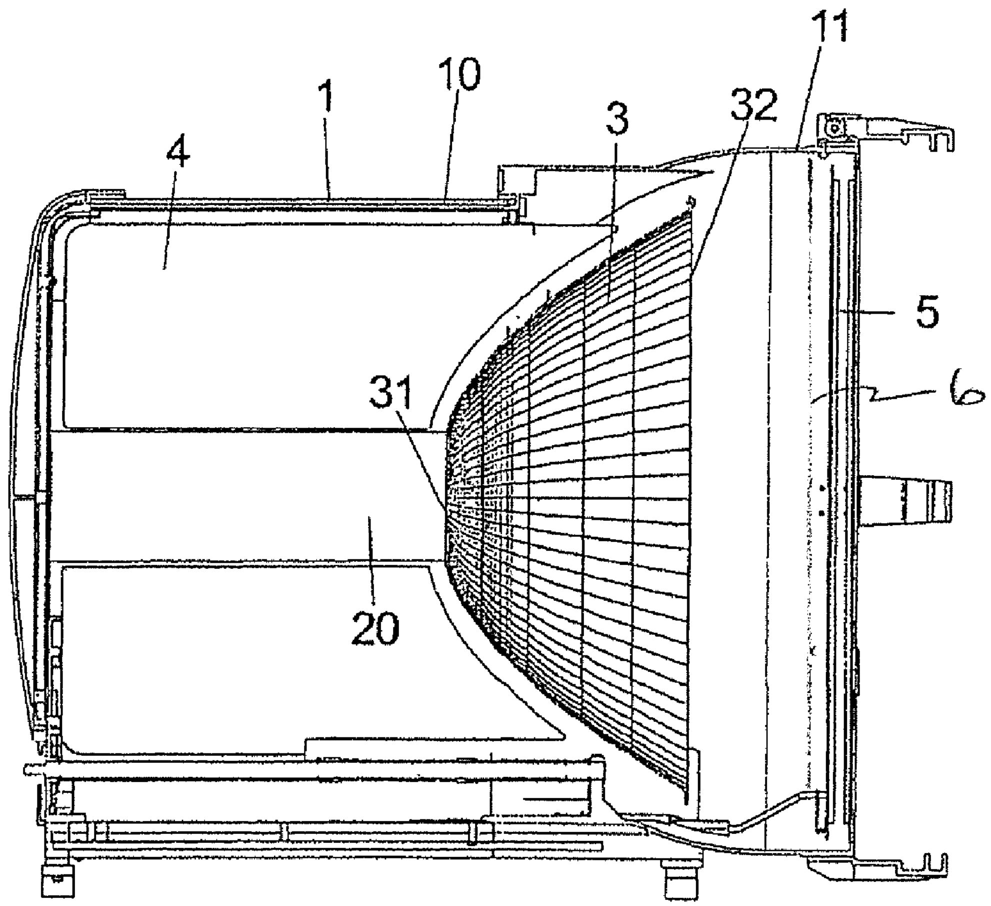
FIG. 2 shows a lateral partial sectional view of a projector having a faceted reflector, with the projector housing cut away.

The front view, shown in FIG. 1, and the lateral partial sectional view, illustrated in FIG. 2, of a projector exhibit a projector housing 1 whose middle region 10 is of substantially cylindrical design and whose front region 11 is adapted to the contour of a reflector 3. The projector has a convective cooling device 4 that in order to produce a convection flow dissipates the heat output by a lamp 2 in a targeted fashion to the upper region of the projector housing 1, and thereby protects the components located in the interior of the projector housing 1 against an excessively high thermal load.

The front side of the projector housing 1, which emits light, is closed by a cover element 5 in the form of a glass plate or a lens plate serving as protective plate. Optionally, further plate(s) 6 would also be arranged on the light exit opening of the projector. The reflector 3 is arranged in the front region of the projector housing 1 and partially enclosed by the convective cooling device 4. In the region of the lamp base 20, the reflector 3 has a first opening 31 through which the lamp 2 fastened on the lamp base 20 extends into the interior of the reflector 3 along the reflector axis of the reflector 3. The lamp 2 generates light beams that are rotationally symmetrical in relation to the reflector axis, are reflected by the reflector 3 toward a second opening 32 of the reflector 3, and leave the projector through the translucent cover element 5.

The lamp 2 is arranged in the interior of the reflector 3 and connected in this case in a stationary fashion to the projector housing 1 via the lamp base 20. In order to set the light beam width, the reflector 3 can be displaced along the reflector axis such that the position of reflector 3 and lamp 2 relative to one another can be varied by displacing the reflector 3. In the case of a bundled light field, that is to say a small light beam width of the exiting light beams, the reflector 3 is moved away from the cover element 5 into a rear position such that the lamp 2 is stationed in a forward position in the reflector 3. In the case of a wide light field, that is to say a large light beam width, the reflector 3 is displaced toward the cover element 5, and the lamp 2 assumes a position near the vertex of the reflector 3. The reflector 3 can in this case be displaced continuously such that the light beam width can be set in a range of half scattering angles between approximately 10° and 50°.

Figure 3:
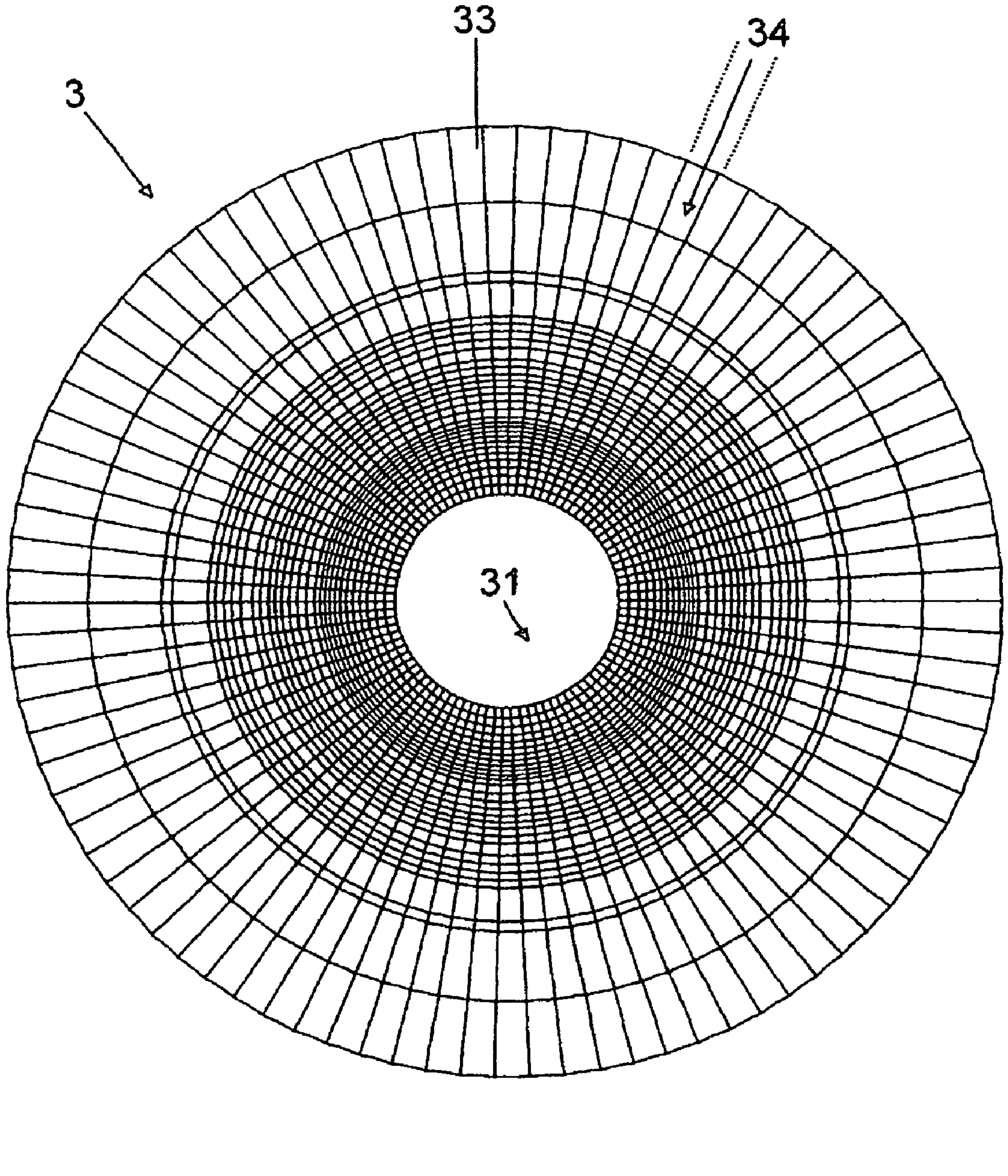
FIG. 3 shows a projection of a reflector onto a plane perpendicular to the reflector axis.
Figure 4:
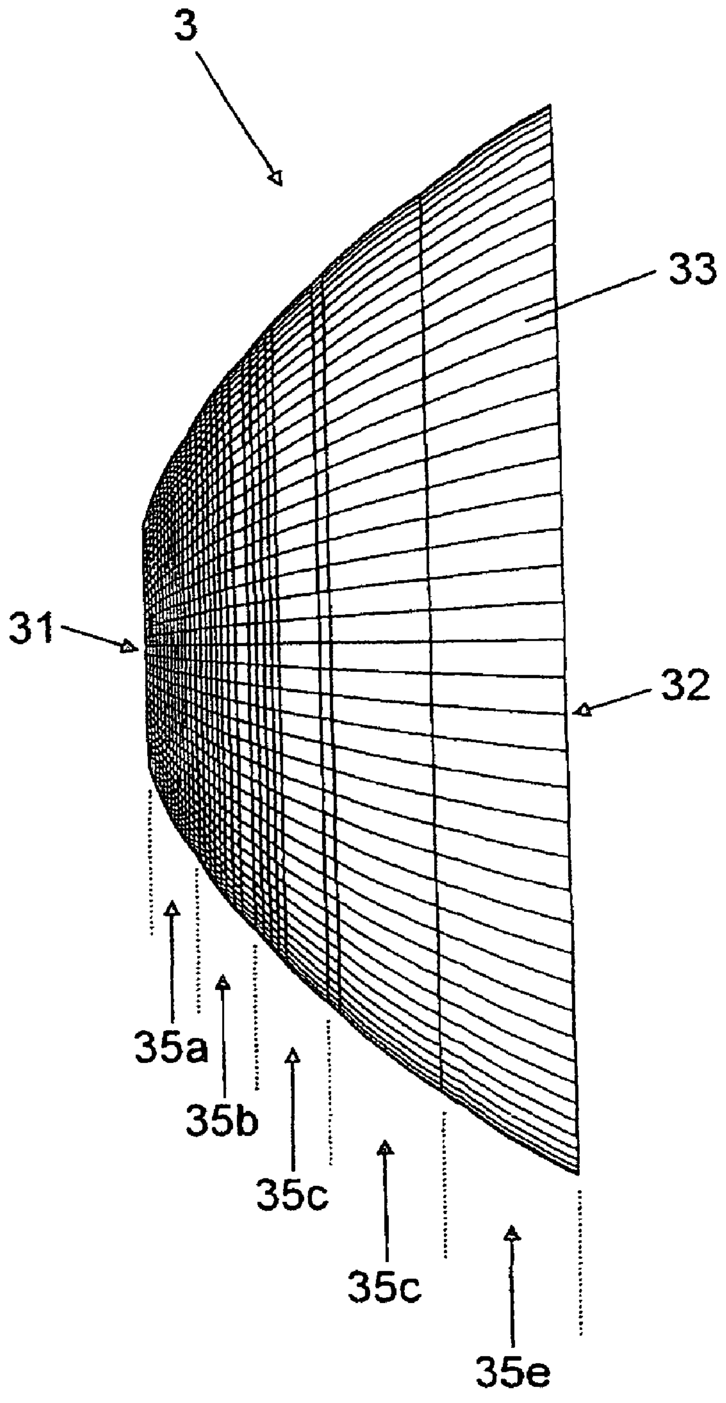
FIG. 4 shows a projection of a reflector onto a longitudinal plane parallel to the reflector axis.
Figure 8:
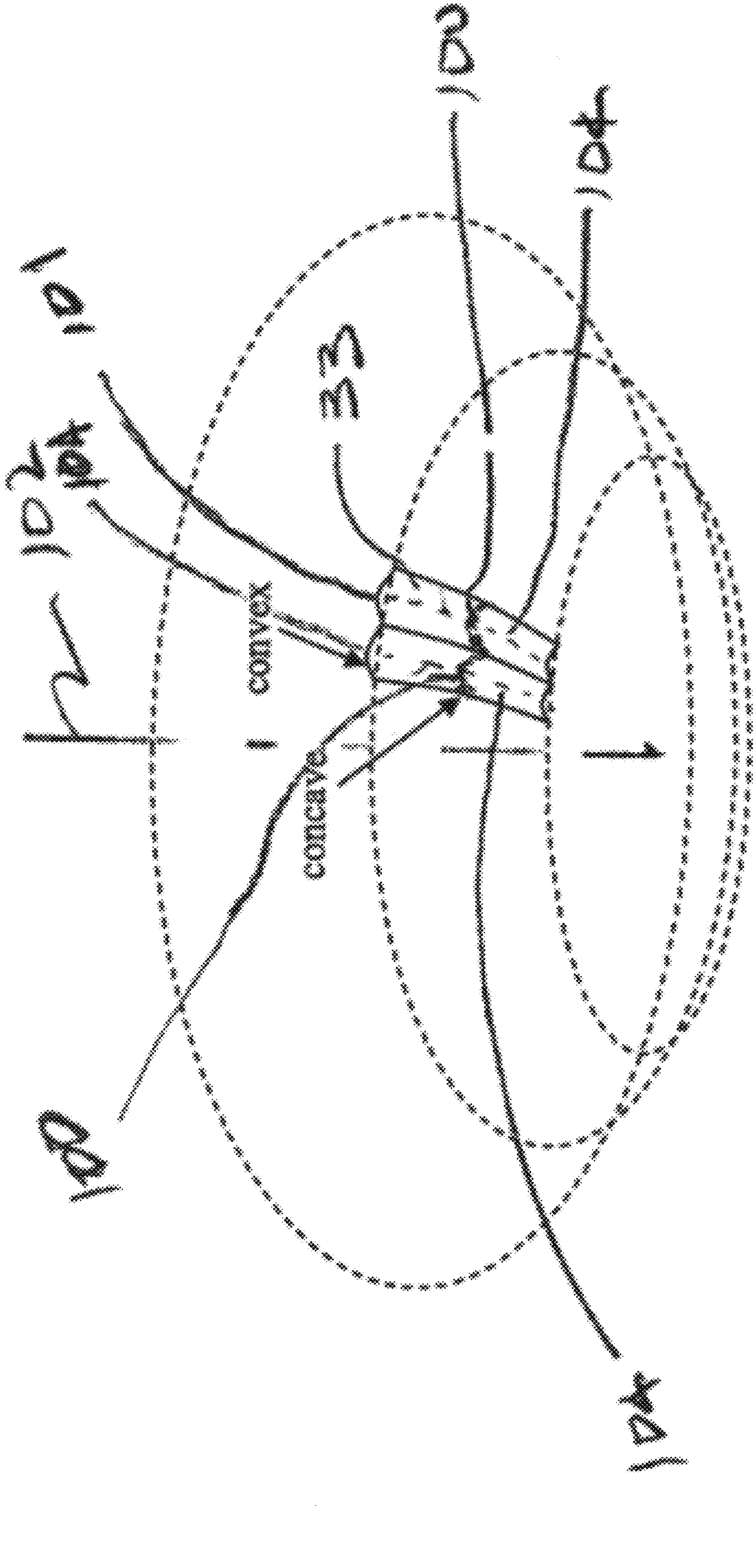
FIG. 8 shows a schematic view of a reflector depicting only two of the facets.

FIGS. 3 and 4 show views of the reflector 3 in which the reflector 3 is, firstly, projected onto a transverse plane perpendicular to the reflector axis (FIG. 3) and, secondly, onto a longitudinal plane (FIG. 4) formed by the reflector axis and a transverse axis perpendicular to the reflector axis. The reflector 3 has a paraboloidal, rotationally symmetrical basic shape and is formed from individual facets 33 that, viewed from the reflector axis, have a convex shape 100 in the cross section perpendicular to the reflector axis (FIGS. 3 and 8), and which are of concave design in the longitudinal section along the reflector axis and a transverse axis (FIGS. 4 and 8). The facets 33 are thus shaped such that they form a belly 101 pointing toward the reflector axis 102 in the cross section, and at the same time are curved in the longitudinal direction in a concave way 104 when viewed from the reflector axis (FIG. 8).

The facets 33 are arranged on the reflector 3 in a multiplicity of sectors 34 that extend from the first opening 31 of the reflector 3, through which the lamp 2 is guided into the interior of the reflector 3, to the second opening 32 of the reflector 3, and widen outward. The uniform arrangement of the facets 33 in the individual sectors 34 result in a division of the facets 33 into columns and rows, the columns extending along the sectors 34 and the rows running perpendicularly thereto along the circumference about the reflector axis. In this case, the facets 33 in a row are identical in shape and size such that a periodic structure formed from the juxtaposition of the facets 33 results along each row. The facets 33 in different rows, by contrast, can differ in shape and size. In particular, the reflector 3 is designed such that the faceting of the reflector 3 becomes narrower in accordance with the angular division into sectors in the inwardly situated rows, that is to say toward the first opening 31 of the reflector 3.

The facets 33 are designed with regard to curvature and arrangement such that they generate an optimum light field distribution. In accordance with FIG. 3 and FIG. 4, the facets 33 of the reflector 3 are arranged in five rings 35*a*-35*e* that are concentric with the reflector axis and of which each has per se a concave shape in the longitudinal section along the reflector axis and a transverse axis, as emerges from FIG. 4. The individual rings 35*a*-35*e* in this case comprise at least partially a number of facet rows, their division becoming narrower toward the first opening 31, which holds the lamp 2, and the number of the rows per ring increasing inwardly.

Figure 5A:
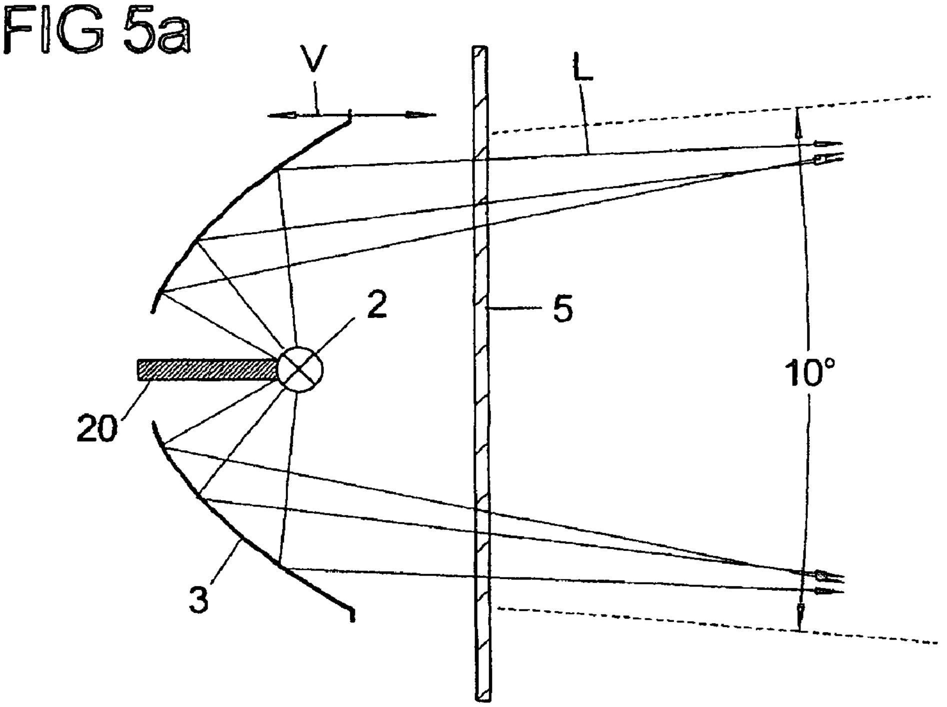
FIG. 5*a* shows a schematic sectional view of a reflector in a first position.
Figure 5B:
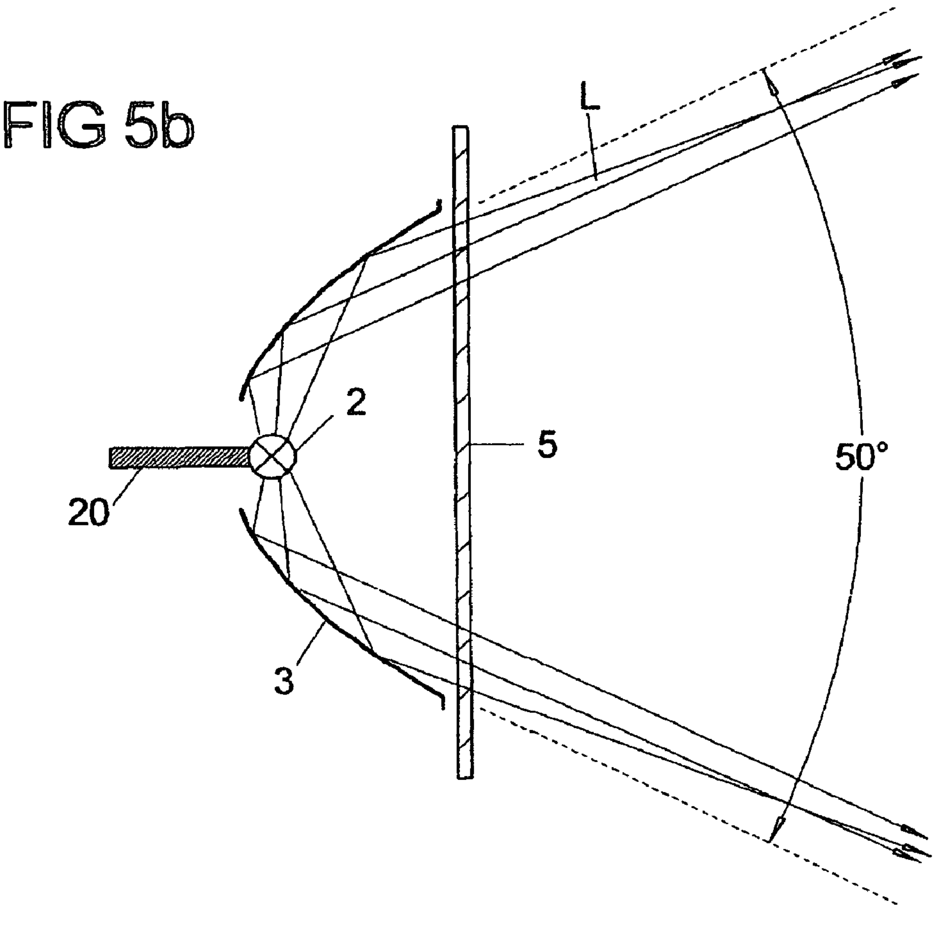
FIG. 5*b* shows a schematic sectional view of a reflector in a second position.

The reflector 3 is arranged displacably in the projector housing 1 along a displacement direction V pointing parallel to the reflector axis, and is displaced in relation to the lamp 2 fastened in the lamp base 20 in order to set the light beam width of the emerging light. FIGS. 5*a* and 5*b* show schematic sectional views of the reflector 3 in different positions relative to the lamp 2. In FIG. 5*a*, the reflector 3 is displaced rearward away from the cover element 5 such that the lamp 2 is stationed in a front position in the reflector 3. This relative position of the lamp 2 to the reflector 3 effects a bundled light field in which the half scattering angle describing the light beam width is small, and the light beams L exit virtually parallel to one another from the reflector 3.

In order to expand the light beam width, the reflector is pushed forward toward the cover element 5 such that the lamp 2 is moved into a position near the vertex of the reflector 3. This state is shown in FIG. 4*b*, in which a wide light field with a large scattering half angle results from the fact that the reflector 3 is displaced in the vicinity of the cover element 5 in a front position in the projector.

The reflector 3 is of faceted design in order to generate a desired light distribution without the use of additional lens plates, diffusion plates or stepped plates. Here, each individual facet 33 absorbs light and generates a reflected beam field, the light beams emanating from the facets 33 intermixing and overlapping one another in the far field in such a way that the desired light distribution results in the far field. By virtue of the fact that it is possible to dispense with additional plates for shaping the emerging light field, the light losses that unavoidably accompany the use of such plates are also avoided, and so the arrangement overall can be designed with less loss than conventional projectors.

Owing to the curved facets 33, the reflector 3 with its reflective surface assembled from the individual facets has no true focal point. In the state of maximum light bundling (see FIG. 5*a*), however, the lamp 2 is stationed at a quasi focal point such that the light beams L emanating from the lamp 2 and reflected by the facets 33 exit from the projector in a virtually parallel fashion. This quasi focal point corresponds in this case to the focal point of the rotationally symmetrical, paraboloidal basic shape of the reflector 3 upon neglecting the local curvature effected by the individual facets 33. In order to expand the light field, the position of the lamp 2 relative to the reflector 3 is then varied such that the spacing between the reflector 3 and lamp 2 becomes smaller, and thus the lamp 2 is moved toward the reflector 3 from the quasi focal point.

In the case of alternative embodiments, the reflector 3 can be arranged in a stationary fashion in the projector, and the lamp 2 can be displaced in order to set the light beam width. The mode of operation of the projector is not impaired thereby. It is also conceivable for the beam path of the projector to be of convergent design such that in the case of a wide light field the exiting light beams L are first condensed in a region in front of a projector housing 1 and only then diverge. In this case, it is expedient that the reflector 3 is displaced rearward in order to expand the light field, the lamp is thus moved into a front position, upstream of the quasi focal point of the reflector, in the reflector 3, while the reflector 3 is displaced rearward in order to bundle the emerging light, so as to bring the lamp 2 into the quasi focal point of the reflector. However, here, as well, the design of the facets 33 effects a mixing of the light beams L, and a desired light field is correspondingly generated without the need for additional components in the form of plates.

The projector can be used, in particular, a high power projector with powers in the kW range. Owing to the large powers converted, much heat is developed in such projectors, and so the components of the projector must be of heat resistant design. This relates, in particular, to the reflector 3, whose facets 33 are produced from special, heat resistant materials such as glass or glass ceramic in regions where the reflector 3 is heated with particular intensity. The reflector 3 in this case reflects a large part of the light power in the region of the inner facet rings 35*a* such that heating occurs there, in particular, and the facets 33 must be of heat resistant design in this region. Such measures are not required in the outer regions 35*d*, 35*e* and so it is possible there to produce the facets 33 from a favorable material such as, for example, metal-coated glass.

Provided for the purpose of cooling the projector is a convective cooling device 4 that partially envelops the reflector 3, as is evident from FIG. 2. The convective cooling device 4 produces a vertical cooling air flow that dissipates the heat and transports it upward in the projector and out of the projector. In order also to enable such a cooling air flow in the inner region of the reflector 3 and through the reflector 3, it is possible to provide in the upper and lower regions of the reflector 3 openings that are created by entirely or partially omitting individual facets 33. This creates channels through which a vertical cooling air flow can dissipate heat from the bottom to the top through the reflector 3 and out of the reflector 3. The reflection of the light beams at the reflector 3 is not substantially influenced in this case by the creation of the openings in the reflector 3, since the reflected light power is approximately proportional to the total area of the reflector 3 and the openings are small by comparison with the total area of the reflector 3. The light distribution in the far field is thus not affected by such measures.

In the case of the embodiments of the reflector 3 illustrated in FIGS. 6*a*, 6*b* and 7*a*, 7*b*, cutouts 36 are created in the reflector by leaving clear whole rows or columns of facets 33 of the reflector 3.

Figure 6B:
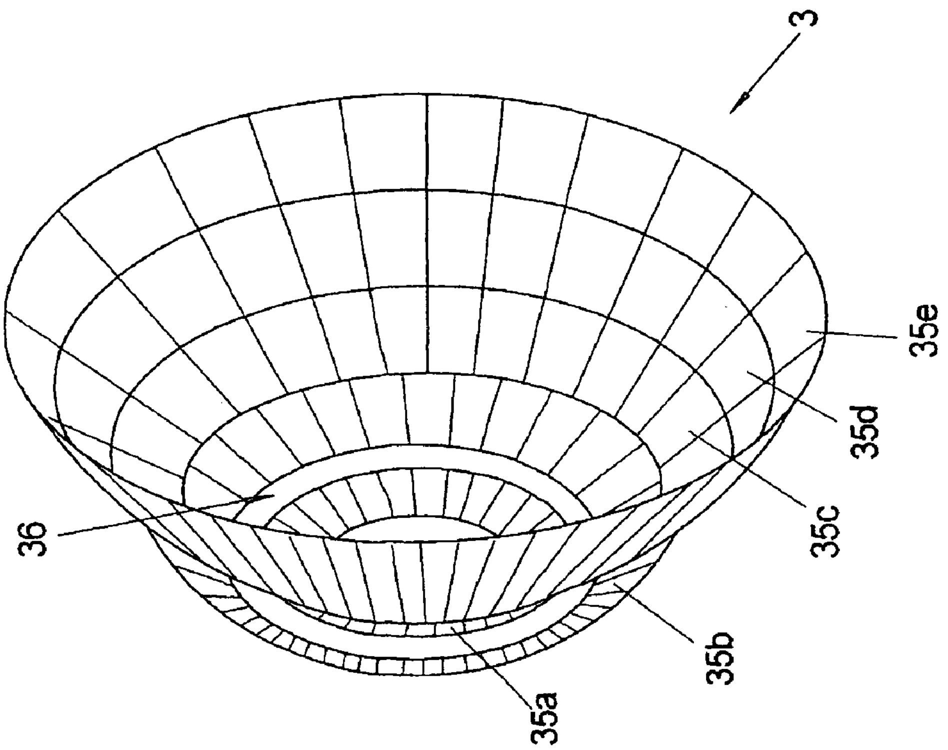
FIG. 6*b* shows a schematic of a reflector with an annular cutout.
Figure 6A:
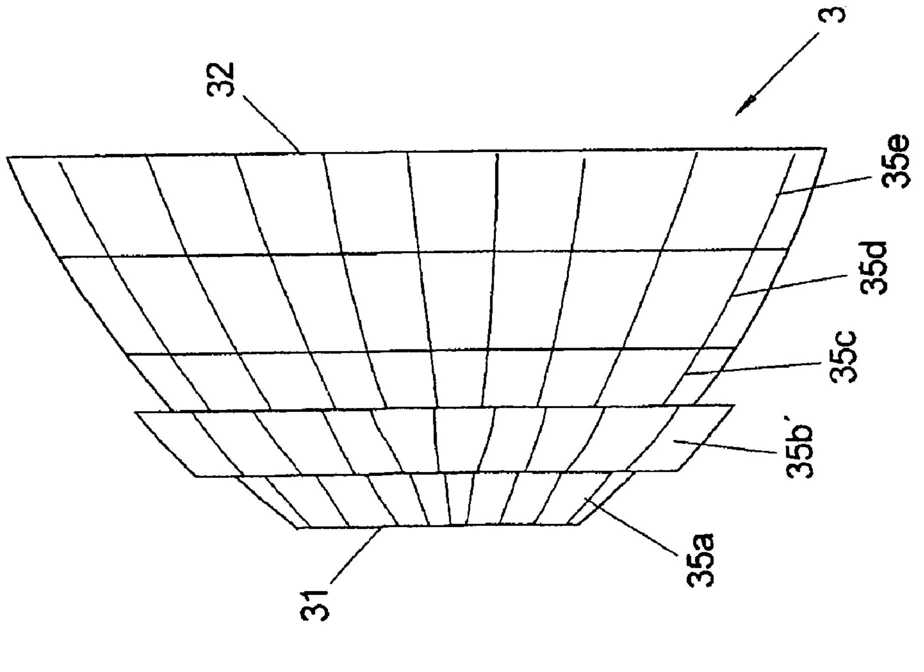
FIG. 6*a* shows a schematic of a reflector with an annular cutout.

FIGS. 6*a* and 6*b* show a reflector in which an annular cutout 36 in the surface of the reflector 3 is covered by a ring 35*b*' of facets 33, the ring 35*b*' being formed from a number of facet rows, having an enlarged diameter and a greater height than the reflector 3 in the region of the cutout 36, and thus being arranged behind the actual reflector 3 when viewed from the reflector axis. This creates a reflector arrangement with a cutout 36 in the case of which, for example, a cooling air flow can penetrate into the interior of the reflector 3 and through the reflector 3, while at the same time the optical behavior of the reflector 3 is not substantially impaired.

The ring 35*b*' serving to cover the cutout 36 is in this case spaced apart radially from the actual reflector 3, it extends essentially parallel to the original surface of the reflector 3 in the region of the cutout 36, and overlaps the respectively neighboring rings 35*a*, 35*c* in the direction of the reflector axis, in order thus to completely cover the cutout 36 when viewed from the reflector axis, in particular from the possible lamp positions on the reflector axis. It is possible in this way to diminish the losses that result from light scattered from the cutout 36 in the reflector 3, such that the efficiency and the light distribution generated in the reflector 3 provided with cutouts 36 in the way described is not substantially influenced.

Figure 7B:
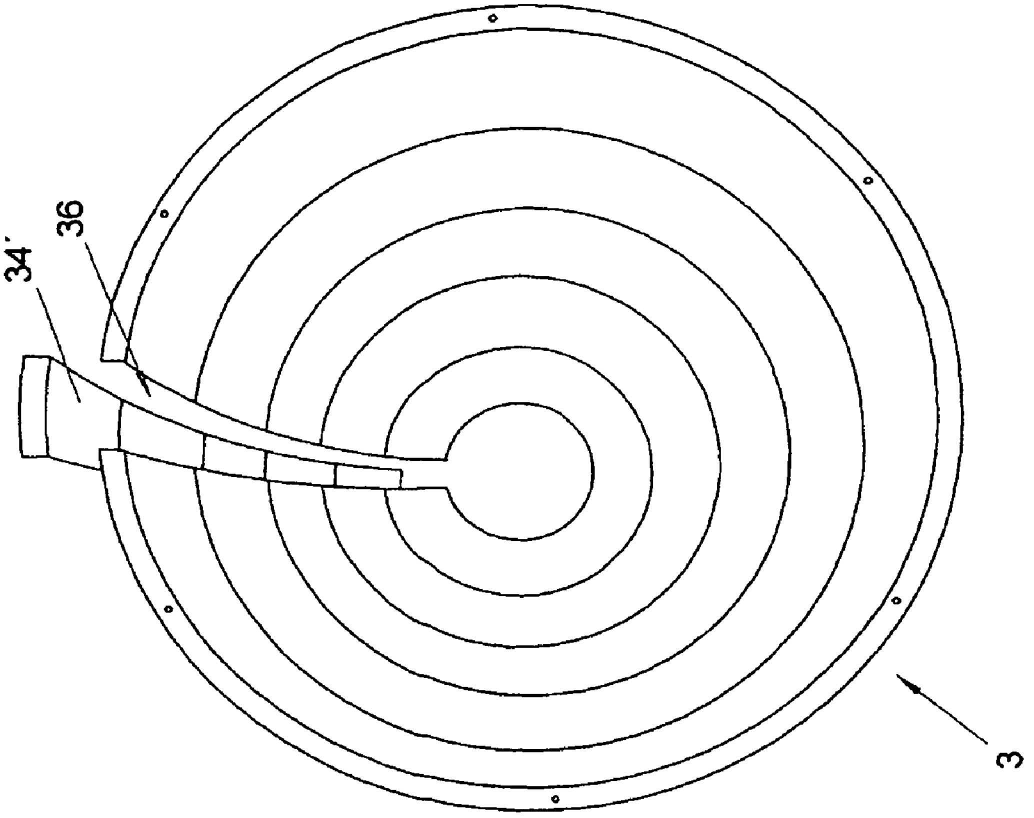
FIG. 7*b* shows a schematic of a reflector with a sector-shaped cutout.
Figure 7A:
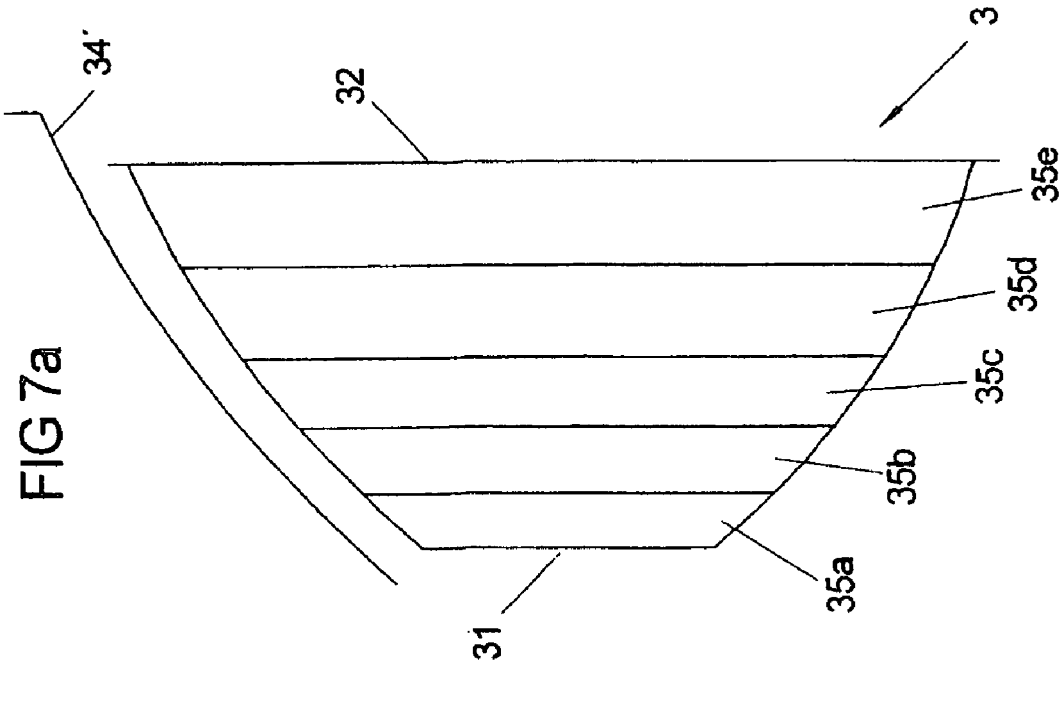
FIG. 7*a* shows a schematic of a reflector with a sector-shaped cutout.

In the reflector 3 illustrated in FIGS. 7*a* and 7*b*, a cutout 36 is created for a cooling flow, for example, by virtue of the fact that a sector-shaped region of facets 33 of the reflector 3 is left clear and is covered by a sector 34' that is radially spaced apart and is arranged behind the actual reflector 3 when seen from the reflector axis. The sector 34' is formed by a number of columns of facets 33 and extends substantially parallel to the original surface of the reflector 3 in the region of its cutout 36. It is evident from FIG. 7*a* that, on the one hand, the sector 34' is enlarged in height along the reflector axis and in a radial direction perpendicular to the reflector axis and, on the other hand, when viewed from the reflector axis it is arranged offset outward, that is to say in a radial direction relative to the actual reflector 3. The sector 34' can in this case additionally be designed along the circumference of the reflector 3 in a fashion perpendicular to the reflector axis such that in the circumferential direction it overlaps the sectors neighboring the sector 34'.

A reflector 3 in accordance with FIGS. 6*a*, 6*b* and 7*a*, 7*b* therefore has a cutout 36 that enables an effective cooling of the reflector 3 and of the lamp 2 that is arranged in the interior of the reflector 3 and enclosed by the latter, the light power and light distribution of the projector not being substantially impaired by the design and the spatial arrangement of the sector 34' or of the ring 35*b*', forming a section for covering the cutout 36, which does not substantially impair the light power and light distribution of the projector, such that the projector has an efficiency comparable to the arrangement having a closed reflector 3.

It may be pointed out here that FIGS. 6*a*, 6*b* and 7*a*, 7*b* are not drawn true to scale and, in particular, that the radial spacing between the section 34', 35' serving to cover the cutout 36 and the reflector 3 can be smaller than illustrated.

In the case of the embodiments of the reflector 3 in accordance with the FIGS. 6*a*, 6*b* and 7*a*, 7*b*, it is possible to ensure that the light distribution generated for the reflector 3 provided with the cutout is comparable to the light distribution of a reflector 3 without cutout 36 by modifying the design of the facets 33 with regard to their curvature and their arrangement in the ring 35*b*' or the sector 34'.

It is conceivable not only to create a single cutout 36, but to produce a number of cutouts in the reflector 3 by omitting, offsetting and/or scaling a number of rings 35*b*' and/or sectors 34' of facets 33, in order to achieve a further improvement in cooling.

Other embodiments of the projector are conceivable. In particular, the invention has been explained here with the aid of a projector having a divergent beam path that uses faceted reflector 3 to shape the light field. However, it is also possible to produce a projector with a convergent beam path that, owing to the design of the faceted reflector 3, likewise has a desired light distribution for a wide range of scattering angles.

The invention claimed is:

1. A projector comprising:

a projector housing comprising a light exit opening, a lamp which via a lamp base is arranged on the projector housing, and a reflector which reflects light beams emitted by the lamp toward the light exit opening, wherein the reflector and the lamp are displaceable with respect to each other, and a distribution of the exiting light is adjustable by displacing the reflector and the lamp with respect to each other, wherein the reflector is provided with facets that form a reflective surface for reflecting the light beams emitted by the lamp, the facets having a surface shaping such that the light beams generate a light field with a desired light distribution and whose light beam width is adjustable by displacing the reflector and the lamp relative to each other, wherein each facet forming the reflector has a concave shape in one spatial direction and a convex shape in another spatial direction such that the light beams reflected by the reflector in each position of the reflector with respect to the lamp exit from the projector as divergent light beams, wherein the reflector comprises multiple concentrical rings wherein at least some of said multiple concentrical rings are formed by multiple rows of facets, wherein said at least some of said multiple concentrical rings have a concave shape formed by the multiple rows of facets when viewed in cross-section along a plane along the reflector axis, wherein a height of the rings, when viewed in a direction along the reflector axis, increases in a direction toward the light exit opening, wherein a ring proximate an inner end of the reflector distant from the light exit opening has a smaller height than a ring closer to the light exit opening, and wherein a number of rows of facets per ring increases when viewed in a direction from the light exit opening toward the inner end of the reflector.

2. The projector of claim 1, wherein a half beam angle describing the light beam width of the exiting light can be set in a range between approximately 10° and 50°.

3. The projector of claim 1, wherein the lamp and the reflector are arranged in a projector housing that has a light exit opening that is covered by a translucent cover element.

4. The projector of claim 1, wherein the spacing between the lamp and reflector can be reduced along a reflector axis in order to expand the light beam width of the exiting light, and can be enlarged in order to decrease the light beam width.

5. The projector of claim 1, wherein the reflector has a paraboloidal or ellipsoidal basic shape that is designed to be rotationally symmetrical about the reflector axis, apart from the surface shaping of the facets forming the reflector.

6. The projector of claim 5, wherein the reflector has a first central opening for holding a lamp, and a second opening as a light exit opening.

7. The projector of claim 6, wherein the first opening for holding the lamp and the second opening are spaced apart in the direction of the reflector axis and are aligned approximately parallel to each other and perpendicular to the reflector axis.

8. The projector of claim 1, wherein the reflector is divided along its circumference about the reflector axis into a multiplicity of sectors in which the facets are arranged.

9. The projector of claim 8, wherein the sectors extend from the first opening of the reflector to the second opening, and form columns of facets.

10. The projector of claim 9, wherein the sectors comprising the columns of facets form a periodic reflector structure.

11. The projector of claim 1, wherein the facets forming the reflector have a concave contour in the longitudinal section along the reflector axis and a transverse axis, and a convex contour in the cross section perpendicular to the reflector axis.

12. The projector of claim 3, wherein plates are arranged in the region of the light exit opening of the projector housing.

13. The projector of claim 12, wherein the plates are designed as lens plates, diffusion plates and/or stepped plates.

14. The projector of claim 1, wherein for the purpose of a heat resistant design of the reflector, the facets forming the reflector are constructed entirely or partially from a heat resistant material and are of single layer or multilayer structure.

15. The projector of claim 1, further comprising a convective cooling device, partially surrounding the lamp, for producing a convection flow that dissipates heat output by the lamp.

16. The projector of claim 15, wherein the reflector has openings that are made by completely or partially removing individual facets and through which a cooling air flow produced by the convective cooling device can flow through the reflector.

17. The projector of claim 1, wherein an annular region of the reflector, comprising one or more rows of facets, is left free, and so there is made in the region of the reflector a cutout through which a cooling air flow can flow through the reflector.

18. The projector of claim 1, wherein a region comprising one or more columns of facets of the reflector is left free, and so there is provided in the surface of the reflector a cutout through which a cooling air flow can flow through the reflector.

19. The projector of claim 17, wherein the cutout is covered by a section that is formed from reflecting facets, wherein said section is spaced apart radially from the surface of the reflector and extends approximately parallel to the surface of the reflector.

20. The projector of claim 18, wherein the cutout is covered by a section that is formed from reflecting facets is spaced apart radially from the surface of the reflector, and extends approximately parallel to the surface of the reflector.

21. The projector of claim 19, wherein the section formed to cover the cutout is formed from facets whose surface shaping and arrangement are constituted such that the reflector generates the desired light distribution.

22. The projector of claim 20, wherein the section formed to cover the cutout is formed from facets whose surface shaping and arrangement are constituted such that the reflector generates the desired light distribution.

23. A projector having a lamp and a reflector that reflects light beams emitted by the lamp toward a light exit opening of the projector wherein the position of the reflector relative to the lamp is variable, and the distribution of the exiting light is set by displacing the reflector and/or the lamp, wherein the reflector is provided with facets that form a reflective surface for reflecting the light beams emitted by the lamp, the facets having a surface shaping such that the light beams generate a light field with a desired light distribution and whose light beam width can be set in a wide range by displacing the reflector and/or the lamp, wherein an annular region of the reflector, comprising one or more rows of facets, is left free and forms a cutout through which a cooling air flow can flow through the reflector, wherein the cutout is covered by a section that is formed from reflecting facets, and wherein said section is spaced apart radially from the surface of the reflector and extends approximately parallel to the surface of the reflector.

24. The projector of claim 23, wherein the section formed to cover the cutout is formed from facets whose surface shaping and arrangement are constituted such that the reflector generates the desired light distribution.

25. A projector having a lamp and a reflector that reflects light beams emitted by the lamp toward a light exit opening of the projector wherein the position of the reflector relative to the lamp is variable, and the distribution of the exiting light is set by displacing the reflector and/or the lamp, wherein the reflector is provided with facets that form a reflective surface for reflecting the light beams emitted by the lamp, the facets having a surface shaping such that the light beams generate a light field with a desired light distribution and whose light beam width can be set in a wide range by displacing the reflector and/or the lamp, wherein a region, comprising one or more columns of facets, of the reflector is left free such that a cutout is formed in the surface of the reflector a cutout through which a cooling air flow can flow through the reflector, wherein the cutout is covered by a section that is formed from reflecting facets, is spaced apart radially from the surface of the reflector, and extends approximately parallel to the surface of the reflector.

26. The projector of claim 25, wherein the section formed to cover the cutout is formed from facets whose surface shaping and arrangement are constituted such that the reflector generates the desired light distribution.

27. A projector comprising a projector housing comprising a light exit opening, a lamp which via a lamp base is arranged in a stationary fashion on the projector housing, a reflector which is arranged displaceably along a reflector axis on the projector housing and which reflects light beams emitted by the lamp toward the light exit opening, wherein a position of the reflector relative to the lamp is variable, and the distribution of the exiting light is adjustable by displacing the reflector in the direction of the light exit opening, wherein the reflector is provided with facets that form a reflective surface for reflecting the light beams emitted by the lamp, the facets having a surface shaping such that the light beams generate a light field with a desired light distribution and whose light beam width is adjustable by displacing the reflector, wherein each facet forming the reflector has a concave shape in one spatial direction and a convex shape in another spatial direction, such that each facet has a convex shape as viewed in cross-section along a plane perpendicular to the reflector axis and is concave in cross-section as viewed along a plane along or parallel to the reflector axis, wherein an annular region of the reflector, comprising one or more rows of facets, is left free and forms a cutout through which a cooling air flow can flow through the reflector, and wherein the cutout is covered by a section that is formed from reflecting facets, wherein said section is spaced apart radially from the surface of the reflector and extends approximately parallel to the surface of the reflector.

28. The projector of claim 27, wherein the section formed to cover the cutout is formed from facets whose surface shaping and arrangement are constituted such that the reflector generates the desired light distribution.

29. A projector comprising a projector housing comprising a light exit opening, a lamp which via a lamp base is arranged in a stationary fashion on the projector housing, a reflector which is arranged displaceably along a reflector axis on the projector housing and which reflects light beams emitted by the lamp toward the light exit opening, wherein a position of the reflector relative to the lamp is variable relative to one another, and the distribution of the exiting light is adjustable by displacing the reflector in the direction of the light exit opening, wherein the reflector is provided with facets that form a reflective surface for reflecting the light beams emitted by the lamp, the facets having a surface shaping such that the light beams generate a light field with a desired light distribution and whose light beam width is adjustable by displacing the reflector, wherein each facet forming the reflector has a concave shape in one spatial direction and a convex shape in another spatial direction, such that each facet has a convex shape as viewed in cross-section along a plane perpendicular to the reflector axis and is concave in cross-section as viewed along a plane along or parallel to the reflector axis, wherein a region, comprising one or more columns of facets, of the reflector is left free such that a cutout is formed in the surface of the reflector through which a cooling air flow can flow through the reflector, and wherein the cutout is covered by a section that is formed from reflecting facets, is spaced apart radially from the surface of the reflector, and extends approximately parallel to the surface of the reflector.

30. The projector of claim 29, wherein the section formed to cover the cutout is formed from facets whose surface shaping and arrangement are constituted such that the reflector generates the desired light distribution.

31. A projector comprising a projector housing comprising a light exit opening;

a lamp arranged within the projector housing; and a reflector arranged within the projector housing, the reflector reflecting light beams emitted by the lamp towards the light exit opening;

wherein the position of the lamp and the reflector are moveable relative to each other to adjust the distribution of the emitted light beams;

wherein the reflector is provided with facets which have a concave shape in one spatial direction and a convex shape in another spatial direction; and wherein the reflector comprises multiple concentrical rings, wherein at least some of said multiple concentrical rings are formed by multiple rows of facets, wherein said at least some of said multiple concentrical rings have a concave shape formed by the multiple rows of facets when viewed in cross-section along a plane along the reflector axis, wherein a height of the rings, when viewed in a direction along the reflector axis, increases in a direction toward the light exit opening, wherein a ring proximate an inner end of the reflector distant from the light exit opening has a smaller height than a ring closer to the light exit opening, and wherein a number of rows of facets per ring increases when viewed in a direction from the light exit opening toward the inner end of the reflector.

32. A projector comprising a projector housing comprising a light exit opening, a lamp which via a lamp base is arranged in a stationary fashion on the projector housing, a reflector which is arranged displaceably along a reflector axis on the projector housing and which reflects light beams emitted by the lamp toward the light exit opening, wherein a position of the reflector and of the lamp are variable relative to one another, and the distribution of the exiting light is adjustable by displacing the reflector in the direction of the light exit opening, wherein the reflector is provided with facets that form a reflective surface for reflecting the light beams emitted by the lamp, the facets having a surface shaping such that the light beams generate a light field with a desired light distribution and whose light beam width is adjustable by displacing the reflector, wherein each facet forming the reflector has a concave shape in one spatial direction and a convex shape in another spatial direction, such that each facet has a convex shape in cross-section along a plane perpendicular to the reflector axis forming a belly pointing towards the reflector axis and has a concave shape in cross-section along a plane along the reflector axis such that the light beams reflected by the reflector in each position of the reflector with respect to the lamp exit from the projector as divergent light beams, wherein an annular region of the reflector, comprising one or more rows of facets, is left free, and so there is defined in the region of the reflector a cutout through which a cooling air flow can flow through the reflector, and wherein the cutout is covered by a section that is formed from reflecting facets, wherein said section is spaced apart radially from the surface of the reflector and extends approximately parallel to the surface of the reflector.

33. A projector comprising a projector housing comprising a light exit opening, a lamp which via a lamp base is arranged in a stationary fashion on the projector housing, a reflector which is arranged displaceably along a reflector axis on the projector housing and which reflects light beams emitted by the lamp toward the light exit opening, wherein a position of the reflector and of the lamp are variable relative to one another, and the distribution of the exiting light is adjustable by displacing the reflector in the direction of the light exit opening, wherein the reflector is provided with facets that form a reflective surface for reflecting the light beams emitted by the lamp, the facets having a surface shaping such that the light beams generate a light field with a desired light distribution and whose light beam width is adjustable by displacing the reflector, wherein each facet forming the reflector has a concave shape in one spatial direction and a convex shape in another spatial direction, such that each facet has a convex shape in cross-section along a plane perpendicular to the reflector axis forming a belly pointing towards the reflector axis and has a concave shape in cross-section along a plane along the reflector axis such that the light beams reflected by the reflector in each position of the reflector with respect to the lamp exit from the projector as divergent light beams, wherein a region, comprising one or more columns of facets, of the reflector is left free, and so there is provided in the surface of the reflector a cutout through which a cooling air flow can flow through the reflector and, wherein the cutout is covered by a section that is formed from reflecting facets, is spaced apart radially from the surface of the reflector, and extends approximately parallel to the surface of the reflector.

34. The projector of claim 32, wherein the section formed to cover the cutout is formed from facets whose surface shaping and arrangement are constituted such that the reflector generates the desired light distribution.

35. The projector of claim 33, wherein the section formed to cover the cutout is formed from facets whose surface shaping and arrangement are constituted such that the reflector generates the desired light distribution.

* * * * *

UNITED STATES PATENT AND TRADEMARK OFFICE

CERTIFICATE OF CORRECTION

PATENT NO. : 8,366,277 B2
APPLICATION NO. : 11/922836
DATED : February 5, 2013
INVENTOR(S) : Melzner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this
Third Day of March, 2015

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : 8,366,277 B2
APPLICATION NO. : 11/922836
DATED : February 5, 2013
INVENTOR(S) : Melzner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 604 days.

Signed and Sealed this
First Day of September, 2015

Michelle K. Lee
*Director of the United States Patent and Trademark Office*